United States Patent
Nakano et al.

(10) Patent No.: US 6,349,789 B1
(45) Date of Patent: Feb. 26, 2002

(54) STEERING DEVICE FOR VEHICLES

(75) Inventors: Shiro Nakano, Osaka; Katsutoshi Nishizaki, Nabari; Masaya Segawa, Nara; Naoki Maeda, Kasiwara; Takanobu Takamatsu, Habikino, all of (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/530,640
(22) PCT Filed: Nov. 6, 1998
(86) PCT No.: PCT/JP98/04991
  § 371 Date: Apr. 27, 2000
  § 102(e) Date: Apr. 27, 2000
(87) PCT Pub. No.: WO99/24307
  PCT Pub. Date: May 20, 1999

(30) Foreign Application Priority Data

Nov. 12, 1997 (JP) ............................................... 9-329603

(51) Int. Cl.$^7$ ............................................... B62D 5/02
(52) U.S. Cl. ........................................ 180/446; 180/443
(58) Field of Search ................................. 180/446, 443, 180/422; 701/41

(56) References Cited

U.S. PATENT DOCUMENTS

| | | | | |
|---|---|---|---|---|
| 5,316,379 A | * | 5/1994 | Becker et al. | 180/408 |
| 5,482,133 A | * | 1/1996 | Iwata et al. | 180/412 |
| 5,845,222 A | * | 3/2000 | Yamamoto et al. | 180/446 |
| 6,032,755 A | * | 3/2000 | Blandino et al. | 180/446 |
| 6,085,860 A | * | 7/2000 | Hackl et al. | 180/443 |

FOREIGN PATENT DOCUMENTS

| | | |
|---|---|---|
| JP | 3-096481 | 4/1991 |
| JP | 3-217373 | 9/1991 |
| JP | 5-178225 | 7/1993 |

* cited by examiner

Primary Examiner—Daniel G. DePumpo
(74) Attorney, Agent, or Firm—Jordan and Hamburg LLP

(57) ABSTRACT

A steering device for vehicles transmits steering torque applied by the driver to wheels. When at least one of braking force and driving force of the wheels is controlled for stabilization of vehicle behavior, steering torque is controlled to cancel out change in the steering torque due to the stabilization according to change in at least one of the braking force and driving force due to the control for the stabilization.

16 Claims, 3 Drawing Sheets

STEERING DEVICE FOR VEHICLES

BACKGROUND

The present invention relates to a steering device linked to a behavior stabilizing system in vehicles.

In the case of a vehicle spinning or drifting due to excessive speed or poor driving when traversing curves, it becomes impossible to steer the vehicle according to the driver's intent. Technology to control the braking force and driving force of the vehicle is being developed in order to prevent unstable vehicle behavior such as drifting or spinning. However, the control of the braking force and driving force to stabilize vehicle behavior is effected irrespective of the driver's will; the problem with this is that the steering feel becomes bad because steering torque is fluctuated on the basis of change in the braking force and driving force.

SUMMARY OF THE INVENTION

It is an object of the present invention to provide a steering device that resolves the above-mentioned problem.

A steering device of the present invention for a vehicle, which includes means for transmitting steering torque applied by the driver to wheels, and is constituted such that at least one of braking force and driving force of the wheels can be controlled for stabilization of vehicle behavior, is characterized in that steering torque can be controlled so as to cancel out change in steering torque according to change in at least one of the braking force and driving force due to the control for the stabilization.

With the above constitution, when the vehicle behavior is stabilized by controlling at least one of the braking force and driving force of the wheels, bad steering feel can be prevented by canceling out the change in the steering torque due to the control for the stabilization. The control for the stabilization of vehicle behavior can be performed by using known means.

The steering device of the present invention preferably comprises a steering shaft for transmitting steering torque applied by the driver to the wheels; an actuator for generating torque to be added to the steering torque applied by the driver; a detector for detecting the steering torque transmitted by the steering shaft; means for determining variables corresponding to change in at least one of braking force and driving force due to control for the stabilization; means for storing relationship between the variables and a change in the steering torque; and means for controlling the torque added by the actuator so as to cancel out the change in the steering torque determined from the variables determined and the relationship stored.

With the above constitution, in the case where at least one of the braking force and driving force is controlled in order to stabilize the vehicle behavior, the change in the steering torque based on the change in at least one of the braking force and driving force can be smoothly canceled out by controlling the torque added to the steering torque applied by the driver.

The variables corresponding to the change in at least one of the braking force and driving force due to the control for the stabilization can be determined as the amount of change from the start of the control for the stabilization in, for example, the braking force of each wheel, rotational speed of each wheel, vehicle speed, steering angle, coefficient of friction between the vehicle and the road surface, yaw rate of the vehicle, and so on. The change in the steering torque can be canceled out with better precision as more types of variables are determined.

The relationship between the variables and the change in the steering torque is established so that the change in the steering torque can be determined from the variables determined according to this relationship. The change in the steering torque can be canceled out when the actuator generates torque with an equal magnitude but opposite direction to the change in the steering torque due to the control for the stabilization.

In the steering device of the present invention, it is preferable that, when at least one of the braking force and driving force is controlled so that a moment acts on the vehicle for the stabilization, steering assistance torque with the same direction as that moment is added by the actuator.

In order to stabilize the vehicle behavior by preventing the vehicle from being oversteered and spinning out, a moment directed opposite to the steering direction of the vehicle is caused to act on the vehicle, for example by making the braking force of the outer wheels greater than the braking force of the inner wheels. In this case, the steering torque is changed so as to cause steering in the direction opposite to the moment acting on the vehicle for the stabilization. Such change in the steering torque acting on the driver can therefore be canceled out by adding steering assistance torque having the same direction as that moment by means of the actuator.

In order to stabilize the vehicle behavior by preventing the vehicle from being understeered and drifting, a moment with the same direction as the steering direction of the vehicle is caused to act on the vehicle, for example by making the braking force of the inner wheels greater than the braking force of the outer wheels. In this case, the steering torque is changed so as to cause steering in the direction opposite to the moment acting on the vehicle for the stabilization. Such change in the steering torque acting on the driver can therefore be canceled out by adding steering assistance torque having the same direction as that moment by means of the actuator.

In the case of controlling the braking force and driving force of the wheels for stabilization of vehicle behavior, the present invention provides a steering device which can improve the steering feel by eliminating fluctuations in steering torque due to the control for the stabilization.

DETAILED DESCRIPTION

Figure 1:
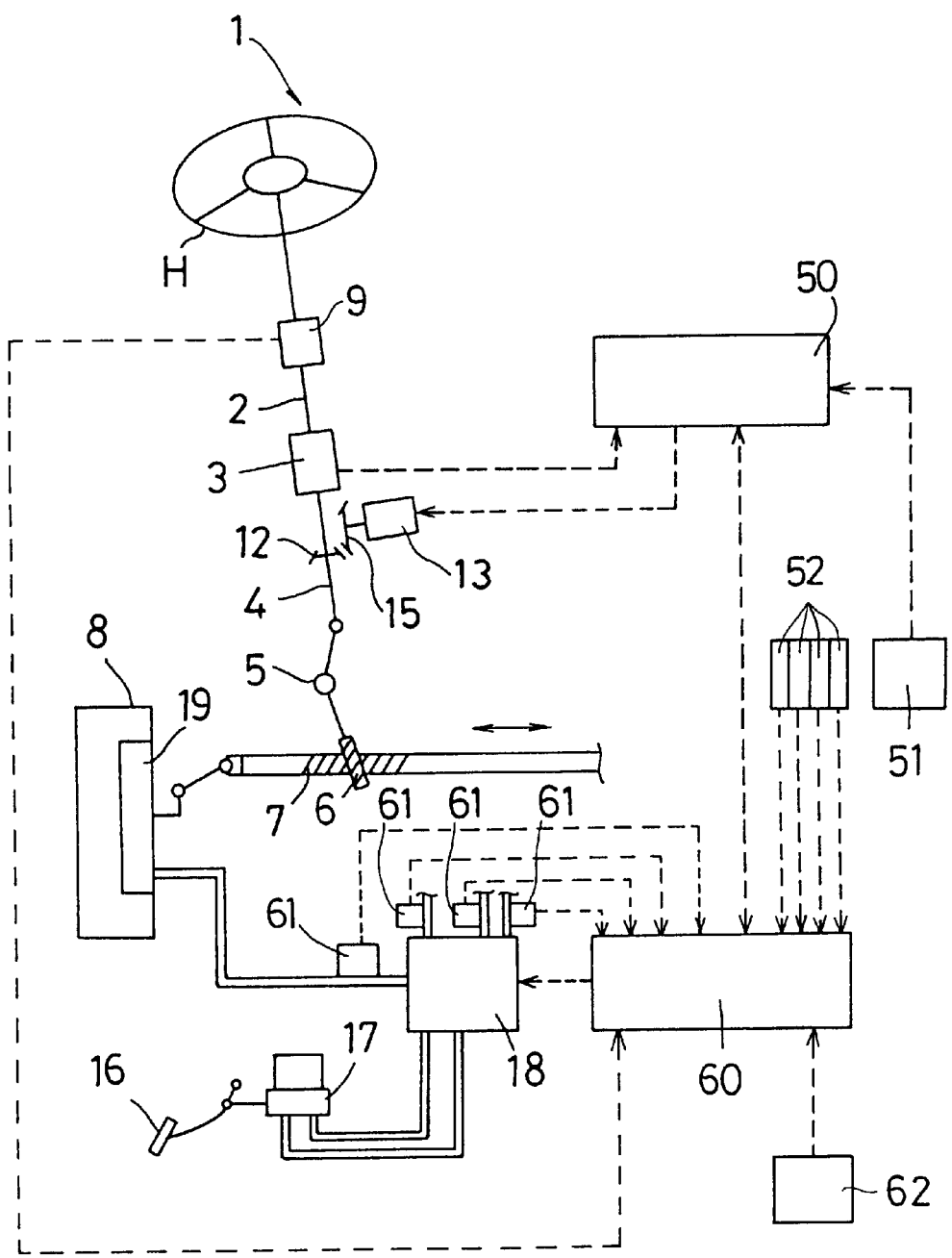
FIG. 1 is a diagram of a steering device of an embodiment of the present invention.

Referring to FIG. 1, a rack and pinion type power steering device 1 has an input shaft 2 connected to a steering wheel H and an output shaft 4 connected to the input shaft 2 via a torque sensor 3. The input shaft 2 and output shaft 4 form a steering shaft for transmitting steering torque applied by the driver to wheels. The output shaft 4 is connected to a pinion 6 via a universal joint 5. The wheels 8 are connected to the rack 7 that engages with the pinion 6. When steering torque is transmitted to the rack 7 via the steering wheel H, input shaft 2, torque sensor 3, output shaft 4, and pinion 6, the vehicle is steered by the movement of the rack 7. Also, a steering angle sensor 9 is mounted on the input shaft 2. The front wheels are steered in this embodiment; alternatively the front and rear wheels may be steered.

A bevel gear 12 is fit around an outer periphery of the output shaft 4. A bevel gear 15 engages with the bevel gear 12 and is caused to rotate by the actuator 13. The actuator 13 thereby generates a torque to be added to the steering torque applied by the driver.

A braking system is established to brake each wheel 8 of the vehicle. Specifically, braking pressure corresponding to foot power on brake pedal 16 is generated by a master cylinder 17. That braking pressure is amplified by a braking pressure control unit 18 and distributed to braking devices 19 for each wheel 8. Each braking device 19 applies braking force to the corresponding wheel 8 based on the braking pressure distributed thereto. The braking pressure control unit 18 is connected to a brake system controller 60 constituted by a computer. A sensor 9 for detecting steering angle, sensors 52 for detecting a rotational speed of each wheel 8, sensors 61 for detecting the braking force for each wheel 8, and a sensor 62 for detecting the coefficient of friction between the vehicle and a road surface are connected to the brake system controller 60. The brake system controller 60 controls the braking pressure control unit 18 so that the braking pressure can be amplified and distributed according to the rotational speed of each wheel 8 detected by each sensor 52 and the feedback value determined from the braking force detected by each sensor 61. It is thereby possible to control the braking force for the wheels on the left side of the vehicle separately from the braking force for the wheels on the right side of the vehicle. The braking pressure control unit 18 is able to generate braking pressure with a self-contained pump, even when the brake pedal 16 is not being operated.

The torque sensor 3 detects the torque transmitted from the input shaft 2 to the output shaft 4, i.e. detects the steering torque transmitted by the steering shaft. The torque sensor 3 is connected to a steering system controller 50 constituted by a computer. The actuator 13, a vehicle speed sensor 51, and the brake system controller 60 are connected to the steering system controller 50.

Figure 2:
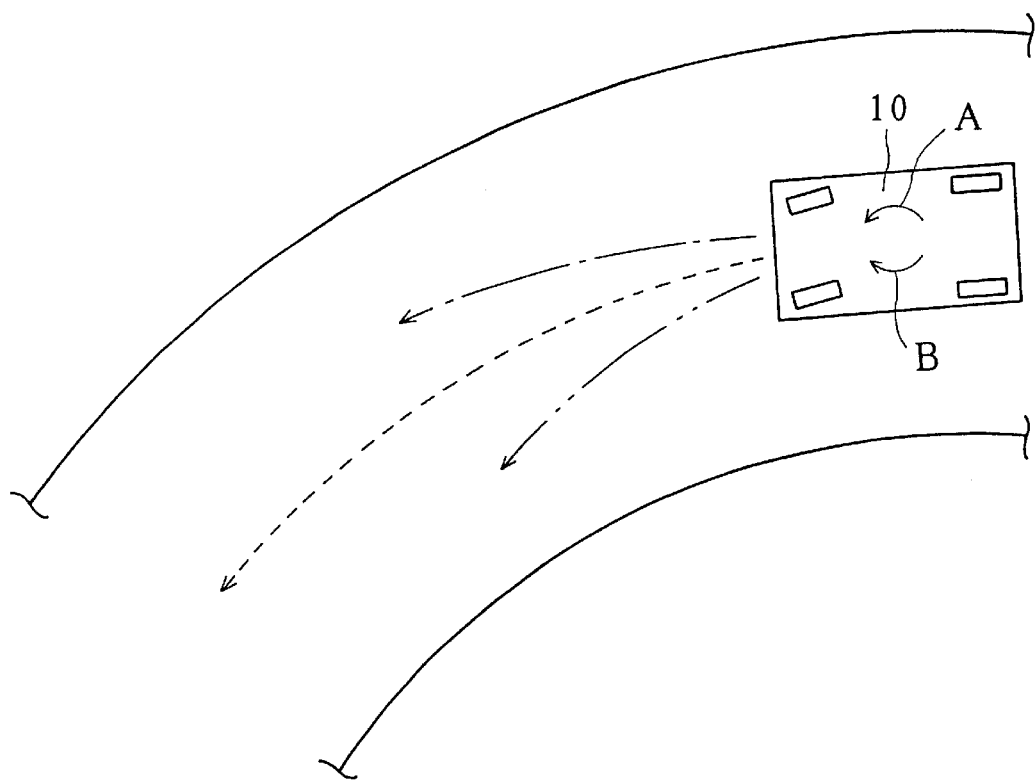
FIG. 2 is a diagram showing driving of a vehicle.

The brake system controller 60 controls the braking force for the wheels 8 for stabilization of vehicle behavior. This control for the stabilization of vehicle behavior can be performed by using known means. For example, relationship between variables that are correlated with vehicle behaviors, such as vehicle speed, steering angle, rotational speed of each wheel, coefficient of friction between the vehicle and road surface, yaw rate of the vehicle, and braking force of each wheel, and moment that causes the vehicle to spin or drift is predetermined based on experimentation, and then the relationship is stored. The moment that causes the vehicle to spin or drift is determined from the values detected by the sensors for the variables correlated to the vehicle behavior and the relationship stored. It is determined based on the moment whether there is a risk of the spin or drift. In the case where there is such a risk, the braking force is controlled so that a moment directed opposite to that moment is caused to act on the vehicle. As shown in FIG. 2, the vehicle 10 follows the ideal path shown by the dotted line as desired by the driver when the behavior of the vehicle 10 is stable during steering. On the other hand, when the vehicle behavior becomes unstable and then the vehicle spins due to the moment shown by the arrow A after oversteering as shown by the two-dot chain line, the vehicle behavior can be stabilized by making the braking force for the outer wheels greater than the braking force for the inner wheels so as to generate a moment shown by the arrow B. Also, when the vehicle behavior becomes unstable and then the vehicle drifts due to the moment shown by the arrow B after understeering as shown by the one-dot chain line, the vehicle behavior can be stabilized by making the braking force for the inner wheels greater than the braking force for the outer wheels so as to generate a moment shown by the arrow A.

Variables corresponding to change in the braking force due to the control for the stabilization can be determined as the amount of change from the start of the control for the stabilization in, for example, the braking force of each wheel 8 detected by the sensors 61, vehicle speed detected by the sensor 51, steering angle detected by the sensor 9, rotational speed of each wheel 8 detected by the sensors 52, and coefficient of friction between the vehicle and road surface detected by the sensor 62. In addition, the variables can be determined as the amount of change in the vehicle yaw rate from the start of the control for the stabilization. The change in the steering torque can be canceled out with better precision as more types of variables are determined.

The steering system controller 50 stores the relationship between the variables and the change in the steering torque. This relationship is established so that the change in the steering torque can be determined from the variables determined according to this relationship, and can be determined based on experimentation.

The steering system controller 50 calculates the change in the steering torque based on the change in the braking force due to the control for the stabilization on the basis of the variables determined and the relationship stored. The steering torque is controlled by controlling the torque added by the actuator 13 so that the change in the steering torque is canceled out. Specifically, the change in the steering torque is canceled when the actuator 13 generates torque with an equal magnitude but an opposite direction to the change in the steering torque due to the control for the stabilization. For example, when the braking force is controlled so that a moment acts on the vehicle for the stabilization of vehicle behavior as noted above, steering assistance torque with the same direction as that moment is added by the actuator 13. Specifically, in the case where a moment shown by arrow B is caused to act to prevent the vehicle from spinning for the stabilization of vehicle behavior, the steering torque is changed so as to steer the vehicle in a direction opposite to that moment, steering assistance torque with the same direction as the moment shown by arrow B is thereby added by the actuator 13. In the case where a moment shown by the arrow A is caused to act to prevent the vehicle from drifting for the stabilization of vehicle behavior, the steering torque is changed so as to steer the vehicle in a direction opposite to that moment, a steering assistance torque with the same direction as the moment shown by arrow A is thereby added by the actuator 13.

Figure 3:
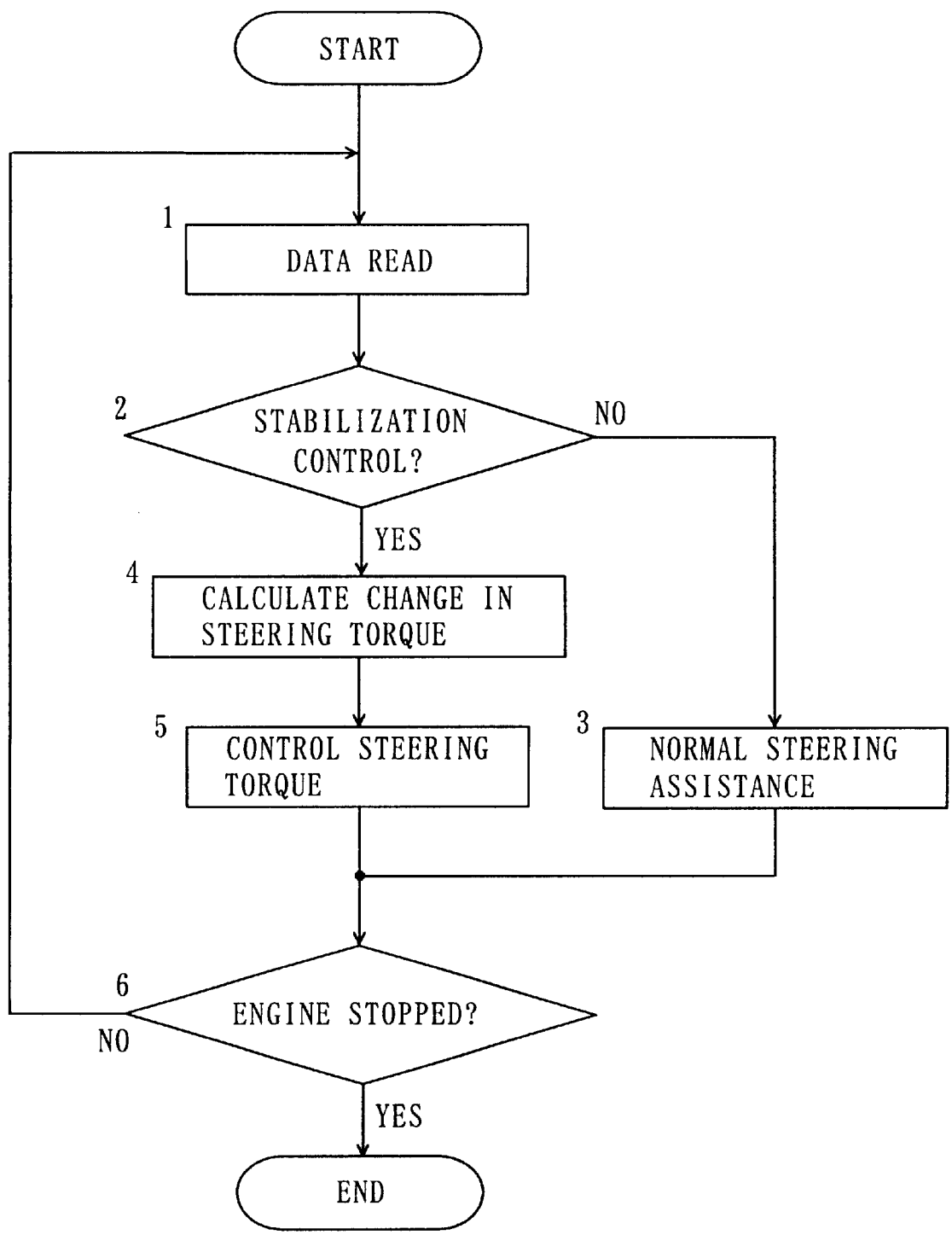
FIG. 3 is a flow chart showing procedures for controlling the steering device relating to the embodiment of the present invention.

Referring to FIG. 3, control procedures for the above-mentioned system are described.

First, the steering system controller 50 and the brake system controller 60 read data detected by the above-mentioned sensors (Step 1).

Next, it is determined whether the braking force is controlled for the stabilization of vehicle behavior (Step 2). This determination is made based on whether the braking force control is being performed to prevent spin or drift as discussed above.

If there is no such control for the stabilization, a normal steering assistance force is applied according to the detected steering torque and vehicle speed by controlling the actuator 13 with the steering system controller 50 (Step 3).

If there is the control for the stabilization of vehicle behavior in Step 2, the change in the steering torque based on the change in the braking force due to the control for the stabilization is determined as described above (Step 4).

Next, the steering torque is controlled by controlling the torque added by the actuator 13 as described above so as to cancel out the change in the steering torque (Step 5).

The above-mentioned control is repeated until the vehicle engine stops (Step 6).

In the above-mentioned embodiment, when spin or drift is prevented to stabilize vehicle behavior by controlling the braking force of the wheels, the change in the steering torque due to the control for the stabilization can be canceled out smoothly, by controlling the torque of the actuator 13 to be added to the steering torque applied by the driver; whereby the bad steering feel can be prevented.

The present invention is not limited by the above-mentioned embodiment. For example, the present invention is applied to a vehicle in which the braking force of the wheels is controlled for stabilization of vehicle behavior in the above-mentioned embodiment. The present invention can also be applied to a vehicle in which driving force of wheels is controlled for stabilization of vehicle behavior, and applied to a vehicle in which both breaking force and driving force are controlled for stabilization of vehicle behavior. In the latter case, the steering torque is controlled so as to cancel out the change in this steering torque based on the change in at least one of the braking force and driving force due to the control for the stabilization. Also, the steering device is not limited to rack and pinion types, ball and screw types can be adopted. Furthermore, type of actuator, type of actuator reduction gear, and the position at which the actuator is connected to the steering mechanism can be established arbitrarily.

The present invention is applied to a system wherein the driver applies steering torque. Instead of such a system, there is an another system wherein a steering wheel and steering device are mechanically separated, an actuator applies steering torque to the steering device, and another actuator is provided to cause torque corresponding to the resistance from the road surface to act on the steering wheel for giving the steering feel to the driver. In such another system, the steering feel can be improved by controlling the torque acting on the steering wheel so as to cancel out the change in the steering torque according to the change in at least one of the braking force and driving force due to the control for the stabilization of vehicle behavior.

What is claimed is:

1. A steering device for a vehicle wherein the vehicle includes vehicle wheels and a controller for stabilization of vehicle behavior by control of wheel forces applied by one of braking and driving forces, the steering device comprising:

a steering shaft for transmitting driver applied steering torque for steering applied by a driver to the vehicle wheels;

an actuator for generating steering assistance torque added to the steering torque applied by the driver;

means for detecting steering torque transmitted by the steering shaft;

means for determining variables corresponding to change in the wheel forces due to the control for the stabilization;

means for storing a relationship between the variables and change in the steering torque due to the control of the wheel forces by the control for stabilization; and means for controlling the steering assistance torque added by the actuator so as to cancel out the change in the steering torque due to the wheel forces controlled by the control for stabilization determined from the variables determined and the relationship stored;

wherein, when the wheel force is controlled by the controller for stabilization so that a moment acts on the vehicle for the stabilization, the steering assistance torque added by the actuator has the same direction as that of the moment such that the steering torque can be controlled so as to cancel out the change in the steering torque due to the control for the stabilization.

2. The steering device according to claim 1 wherein the means for controlling the torque added by the actuator cancels the changes in the steering torque due to the wheels forces which are applied by braking controlled by the controller for stabilization.

3. The steering device according to claim 2 wherein the vehicle behavior is at least one of spin and drift.

4. The steering device according to claim 2 wherein the means for controlling the torque added by the actuator cancels the changes in the steering torque due to the wheels forces which are also applied by driving forces controlled by the controller for stabilization.

5. The steering device according to claim 4 wherein the vehicle behavior is at least one of spin and drift.

6. The steering device according to claim 1 wherein the means for controlling the torque added by the actuator cancels the changes in the steering torque due to the wheels forces which are applied by driving forces controlled by the controller for stabilization.

7. The steering device according to claim 6 wherein the vehicle behavior is at least one of spin and drift.

8. The steering device according to claim 1 wherein the vehicle behavior is at least one of spin and drift.

9. A steering device for a vehicle wherein the vehicle includes vehicle wheels and a controller for stabilization of vehicle behavior by control of wheel forces applied by one of braking and driving forces, the steering device comprising:

a steering shaft for transmitting driver applied steering torque for steering applied by a driver to the vehicle wheels;

an actuator for generating steering assistance torque added to the steering torque applied by the driver;

a detector for detecting steering torque transmitted by the steering shaft; and a controller, responsive to the detector for detecting steering torque, for controlling the actuator to add steering assistance torque so as to cancel out a change in the steering torque due to the wheel forces controlled by the control for stabilization.

10. The steering device according to claim 9 wherein the controller for controlling the torque added by the actuator cancels the changes in the steering torque due to the wheels forces which are applied by braking controlled by the controller for stabilization.

11. The steering device according to claim 10 wherein the vehicle behavior is at least one of spin and drift.

12. The steering device according to claim 10 wherein the controller for controlling the torque added by the actuator cancels the changes in the steering torque due to the wheels forces which are also applied by driving forces controlled by the controller for stabilization.

13. The steering device according to claim 12 wherein the vehicle behavior is at least one of spin and drift.

14. The steering device according to claim 9 wherein the controller for controlling the torque added by tie actuator cancels the changes in the steering torque due to the wheels forces which are applied by driving forces controlled by the controller for stabilization.

15. The steering device according to claim 14 wherein the vehicle behavior is at least one of spin and drift.

16. The steering device according to claim 9 wherein the vehicle behavior is at least one of spin and drift.

* * * * *